(12) United States Patent
Ogura et al.

(10) Patent No.: US 10,756,646 B2
(45) Date of Patent: Aug. 25, 2020

(54) MULTI-LEVEL INVERTER CONTROL DEVICE AND CONTROL METHOD

(71) Applicant: MEIDENSHA CORPORATION, Tokyo (JP)

(72) Inventors: Kazuya Ogura, Numadu (JP); Kunihiko Saiki, Numadu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 16/633,002

(22) PCT Filed: Apr. 13, 2018

(86) PCT No.: PCT/JP2018/015458
§ 371 (c)(1),
(2) Date: Jan. 22, 2020

(87) PCT Pub. No.: WO2019/021547
PCT Pub. Date: Jan. 31, 2019

(65) Prior Publication Data
US 2020/0212822 A1 Jul. 2, 2020

(30) Foreign Application Priority Data

Jul. 27, 2017 (JP) .................................. 2017-144996

(51) Int. Cl.
*H02M 1/08* (2006.01)
*H02M 7/487* (2007.01)
(Continued)

(52) U.S. Cl.
CPC .......... *H02M 7/487* (2013.01); *H02M 1/084* (2013.01); *H02M 7/539* (2013.01); *H02M 2001/0054* (2013.01)

(58) Field of Classification Search
None
See application file for complete search history.

(56) References Cited

U.S. PATENT DOCUMENTS

2012/0033470 A1* 2/2012 Muneshima .......... H02M 7/219
363/123
2012/0243276 A1 9/2012 Hattori et al.
(Continued)

FOREIGN PATENT DOCUMENTS

JP 2006-87257 A 3/2006
JP 2012-070498 A 4/2012
(Continued)

*Primary Examiner* — Jeffrey A Gblende
(74) *Attorney, Agent, or Firm* — Foley & Lardner LLP

(57) ABSTRACT

The invention provides a multi-level inverter control device that is capable of reducing loss of a switching element of a maximum current phase that occurs in an extremely low speed region or at zero frequency. The control device has a maximum current phase selector 52 configured to select a maximum current phase whose current amplitude is a maximum on the basis of current detected values or current command values of a three-phase N-level inverter (N is odd number of three or more); a subtractor 54U, 54V, 54W configured to subtract a voltage command value of a selected maximum current phase from each of the voltage command values of the three phases of the inverter; and a switching signal generator 55 configured to compare each of subtracted voltage command values of the three phases with the (N−1) carrier signals and generate a switching signal of each switching element of the inverter.

6 Claims, 6 Drawing Sheets

BASIC CONFIGURATION OF THE INVENTION

(51) Int. Cl.
  *H02M 1/084* (2006.01)
  *H02M 7/539* (2006.01)
  *H02M 1/00* (2006.01)

(56) References Cited

U.S. PATENT DOCUMENTS

2014/0077733 A1* 3/2014 Kashima ................. H02P 27/00
                                                318/400.2
2016/0072406 A1   3/2016 Sato
2019/0131887 A1*  5/2019 Mori ................... H02M 7/5395

FOREIGN PATENT DOCUMENTS

| | | |
|---|---|---|
| JP | 2013-21895 A | 1/2013 |
| JP | 2016-32373 A | 3/2016 |
| JP | 2016-42772 A | 3/2016 |

\* cited by examiner

BASIC CONFIGURATION OF THE INVENTION

CARRIERS, VOLTAGE AND CURRENT BEFORE MODULATION

THREE PHASE VOLTAGE COMMAND VALUES BEFORE MODULATION

CARRIERS, VOLTAGE AND CURRENT AFTER MODULATION

THREE PHASE VOLTAGE COMMAND VALUES AFTER MODULATION

REPRESENTATIVE CONFIGURATION OF FIVE-LEVEL INVERTER

CIRCUIT CONFIGURATION HAVING GAIN CALCULATING OPERATION
FOR BEING APPLIED ONLY TO LOW SPEED REGION

CIRCUIT PERFORMING VOLTAGE SELECTION BY CURRENT PHASE

EXAMPLE OF THREE-LEVEL INVERTER

CURRENT CONCENTRATION

WHEN FREQUENCY BECOMES ZERO IN THIS STATE, SINCE CURRENT CONCENTRATES ON U-PHASE, LOSS IS INCREASED ONLY IN U-PHASE

PHASE DIFFERENCE BETWEEN VOLTAGE AND CURRENT

VOLTAGE, CURRENT AND LOSS

MULTI-LEVEL INVERTER CONTROL DEVICE AND CONTROL METHOD

TECHNICAL FIELD

The present invention relates to a voltage-type multi-level inverter having three or more levels, and also relates to a technique for preventing phase concentration of a loss which occurs in an extremely low speed region or at a zero frequency.

BACKGROUND ART

FIG. 9A shows a representative example of a circuit configuration of a three-level inverter. In FIG. 9A, a capacitor series circuit is formed by two capacitors C1 and C2 as DC voltage sources being connected in series. A U-phase circuit 10U, a V-phase circuit 10V and a W-phase circuit 10W are connected to this capacitor series circuit in parallel.

The U-phase circuit 10U has switching elements U1 to U4 which are connected in series and diodes $D1_U$ and $D2_U$ which are connected in series between a common connecting point of the switching elements U1 and U2 and a common connecting point of the switching elements U3 and U4. A common connecting point of the diodes $D1_U$ and $D2_U$ is connected to a neutral point NP that is a common connecting point of the capacitors C1 and C2. A common connecting point of the switching elements U2 and U3 serves as a U-phase output end.

The V-phase circuit 10V has switching elements V1 to V4 which are connected in series and diodes $D1_V$ and $D2_V$ which are connected in series between a common connecting point of the switching elements V1 and V2 and a common connecting point of the switching elements V3 and V4. A common connecting point of the diodes $D1_V$ and $D2_V$ is connected to the neutral point NP. A common connecting point of the switching elements V2 and V3 serves as a V-phase output end.

The W-phase circuit 10W has switching elements W1 to W4 which are connected in series and diodes $D1_W$ and $D2_W$ which are connected in series between a common connecting point of the switching elements W1 and W2 and a common connecting point of the switching elements W3 and W4. A common connecting point of the diodes $D1_W$ and $D2_W$ is connected to the neutral point NP. A common connecting point of the switching elements W2 and W3 serves as a W-phase output end.

Each voltage value of the capacitors C1 and C2 is E. An end of the capacitor C1 at the switching element U1 side is +E level, the neutral point NP is 0 level, and an end of the capacitor C2 at the switching element U4 side is −E level. Each of the switching elements U1 to U4, V1 to V4 and W1 to W4 is formed by a self-arc-extinguishing type (or self-tern-off type) semiconductor device such as an IGBT.

In the circuit configuration shown in FIG. 9A, by an ON/OFF operation of each switching element, three level phase voltages of E, 0 and −E are outputted (with the neutral point NP being a reference of the phase voltage). An ON/OFF command signal of each switching element is determined by a comparison between a sine wave voltage command and two stages of carriers 1 and 2, as shown in FIG. 10. In FIG. 10, a thick solid line is a U-phase voltage command, a broken line is a U-phase current, and thin solid lines are the carriers 1 and 2.

Table 1 shows the ON/OFF command signals of the U-phase switching elements (U1 to U4) and the U-phase output voltages in comparison states between the U-phase voltage command and the carriers 1 and 2.

[Table 1]

The switching operation takes place when the switching element is turn ON (OFF→ON) or turn OFF (ON→OFF). That is, the switching operation takes place at a cross point between the voltage command and the carriers 1 and 2 shown in FIG. 10.

FIG. 10 shows the U-phase voltage command as a representative. Likewise, the ON/OFF signal commands of the switching elements for the V-phase and the W-phase are determined by a comparison between a V-phase voltage command or a W-phase voltage command and the carriers 1 and 2.

Here, a method of reducing a loss of the switching element in the inverter device has been proposed in, for instance, Patent Documents 1 and 2.

CITATION LIST

Patent Document

Patent Document 1: Japanese Unexamined Patent Application Publication No. 2016-042772
Patent Document 2: Japanese Unexamined Patent Application Publication No. 2012-070498

SUMMARY OF THE INVENTION

Technical Problem

As uses for the inverter, there are a power measuring device, an injection molding machine and an elevator. Regarding the power measuring device inverter, there is a case where a continuous operation for measuring a torque etc. at a start on a hill is performed at an extremely low speed (i.e. in a state in which a frequency of an inverter output voltage is extremely low) or at a zero speed (a zero frequency). Further, there is a case where the injection molding machine etc. keep on applying a pressure at a zero speed.

When the operation is performed for a long time at such an extremely low speed or such a zero speed, since a time for which current concentrates on a certain phase is long, a loss of the switching element of this phase becomes great, then heat generation occurs.

For example, at a time shown by an arrow in FIG. 9B that illustrates each current waveform of the U-phase, the V-phase and the W-phase during the operation of the three-level inverter shown in FIG. 9A, when the frequency of the inverter output voltage becomes zero, the U-phase current keeps on concentrating (the current concentrates on the U-phase). Therefore, a loss of the U-phase switching element becomes great, then heat generation occurs In order to prevent the switching element from being damaged by temperature of this heat generation, there is a need to limit an output torque. Because of this, a sufficient torque cannot be obtained in the extremely low speed region.

On the other hand, regarding the elevator inverter, there is a situation in which a large current flows in an extremely low speed region (at an extremely low speed) during a very-low speed operation for stopping the elevator or for adjusting a position of the elevator or during a low speed operation for performing an maintenance of the elevator. Also in this case, since a time for which current concentrates on a certain phase is long, a temperature ripple of the switching element of a specific phase becomes large, then this shortens a life of the switching element.

For these reasons, for the power measuring device inverter, the injection molding machine inverter and the elevator inverter, in general, a large rating of the switching element is required, and a design with a margin is required. Therefore, if the reduction in the loss of the switching element can be possible in the extremely low speed region of several Hz or lower or in the zero speed region, the rating of the switching element can be lowered, and this can lead to a cost reduction and an improvement in reliability.

Here, the loss of the switching element will be explained. As shown in FIG. 11 that illustrates a relationship between voltage·current and loss of the switching element in the inverter circuit, the switching element has a conduction loss due to conduction of current and a switching loss due to switching (switching of OFF→ON or ON→OFF).

The conduction loss occurs by the product of a phase current flowing through that phase and an ON voltage of the switching. Therefore, the conduction loss is substantially proportional to the phase current. On the other hand, the switching loss occurs at the switching operation of the output voltage and the phase current in a transient state of a case where the switching is performed. The switching loss is substantially proportional to a DC voltage (in FIG. 9A, voltages of the series circuit of the capacitors C1 and C2) of the inverter and the phase current.

Since the output voltage is controlled by selection of the DC voltage in a voltage-type inverter, the conduction loss and the switching loss occur, and these losses are substantially proportional to the phase current (FIG. 10).

As a method of reducing these losses, there is a method that stops a switching operation of the switching element of a certain phase, and reduces the switching loss (two-arm modulation or methods disclosed in Patent Documents 1 and 2).

However, in all these methods, a voltage phase is a reference, and as shown in FIG. 10, in a case where an output voltage phase and a current phase are different (i.e. in a case of a load power factor≠1), a maximum effect cannot be obtained.

Especially in the case of an induction motor, since an exciting current is needed, the voltage phase and the current phase shift by about 30 to 90 degrees. Further, when performing a current control, an amplitude itself of the output voltage becomes small in the extremely low speed region, and also, since the voltage is changed for performing the current control, a waveform of the voltage does not become a normal sine wave, but a distorted sine wave, then it is difficult to identify the voltage phase.

In addition, in a case where an output frequency is zero and is fixed to a certain phase, if a maximum current phase is not known or grasped, a switching operation of a wrong phase might be stopped, then a stable loss suppression cannot be performed.

The present invention was made in view of the above problems. An object of the present invention is therefore to provide a control device of a multi-level inverter and a method of controlling the multi-level inverter which are capable of reducing the loss of the switching element of the maximum current phase that occurs in the extremely low speed region or at the zero frequency.

Solution to Problem

As a control device of a multi-level inverter to solve the above problems, disclosed in claim 1, the multi-level inverter is a three-phase N-level inverter (N is odd number of three or more) and generates a switching signal of each switching element in the three-phase N-level inverter by a comparison between each of voltage command values of a U-phase, a V-phase and a W-phase and (N−1) carrier signals, and the control device of the multi-level inverter comprises: a maximum current phase selector configured to select a maximum current phase whose current amplitude is a maximum on the basis of current detected values or current command values of the three phases of the N-level inverter; a subtractor configured to subtract a voltage command value of a selected maximum current phase from each of the voltage command values of the three phases of the N-level inverter; and a switching signal generator configured to compare each of subtracted voltage command values of the three phases with the (N−1) carrier signals and generate a switching signal of each switching element of the N-level inverter.

As the control device of the multi-level inverter disclosed in claim 2, the control device of the multi-level inverter as claimed in claim 1, further comprises: a gain corrector configured to add a gain to the voltage command value of the maximum current phase selected by the maximum current phase selector so as to decrease the gain in a region in which an output frequency of the inverter is a setting frequency or higher. And, the subtractor is configured to subtract an output of the gain corrector from each of the voltage command values of the three phases.

As the control device of the multi-level inverter disclosed in claim 3, in the control device of the multi-level inverter as claimed in claim 1 or 2, the maximum current phase selector is configured to select the maximum current phase on the basis of phases of the current detected values or phases of the current command values instead of the current detected values or the current command values of the three phases.

As a method of controlling a multi-level inverter disclosed in claim 4, the multi-level inverter is a three-phase N-level inverter (N is odd number of three or more) and generates a switching signal of each switching element in the three-phase N-level inverter by a comparison between each of voltage command values of a U-phase, a V-phase and a W-phase and (N−1) carrier signals, and a method of controlling the multi-level inverter, comprises: a maximum current phase selecting step of selecting a maximum current phase whose current amplitude is a maximum on the basis of current detected values or current command values of the three phases of the N-level inverter; a subtracting step of subtracting a voltage command value of a selected maximum current phase from each of the voltage command values of the three phases of the N-level inverter; and a switching signal generating step of comparing each of subtracted voltage command values of the three phases with the (N−1) carrier signals and generating a switching signal of each switching element of the N-level inverter.

As the method of controlling the multi-level inverter disclosed in claim 5, the method of controlling the multi-level inverter as claimed in claim 4, further comprises: a gain correcting step of adding a gain to the voltage command value of the maximum current phase selected by the maximum current phase selecting step so as to decrease the gain in a region in which an output frequency of the inverter is a setting frequency or higher. And, in the subtracting step, an output of the gain correcting step is subtracted from each of the voltage command values of the three phases.

As the control device of the multi-level inverter disclosed in claim 6, in the method of controlling the multi-level inverter as claimed in claim 4 or 5, in the maximum current phase selecting step, the maximum current phase is selected on the basis of phases of the current detected values or phases of the current command values instead of the current detected values or the current command values of the three phases.

(1) According to the inventions disclosed in claims 1 to 6, the switching loss of the maximum current phase can be zero, and unbalanced occurrence of the loss between the phases can be reduced, then increase in temperature of the switching element of the specific phase can be suppressed. Hence, the limit of the output torque for preventing damage to the switching element due to the temperature increase can be lowered, then a sufficient torque can be obtained also in the extremely low speed region.

Further, since the temperature ripple of the switching element of the specific phase is decreased, it is possible to prolong a life of the switching element.

(2) According to the inventions disclosed in claims 2 and 5, effects described in (1) can be obtained only in the extremely low speed region or at the zero frequency, and interference with other control in a high speed region can be avoided.

(3) According to the inventions disclosed in claims 3 and 6, an operating load on the maximum current phase selector can be lightened.

BRIEF DESCRIPTION OF THE DRAWINGS

FIG. 9A is a circuit diagram.

FIG. 9B is a current waveform diagram of each phase.

EMBODIMENTS FOR CARRYING OUT THE INVENTION

Figure 4:
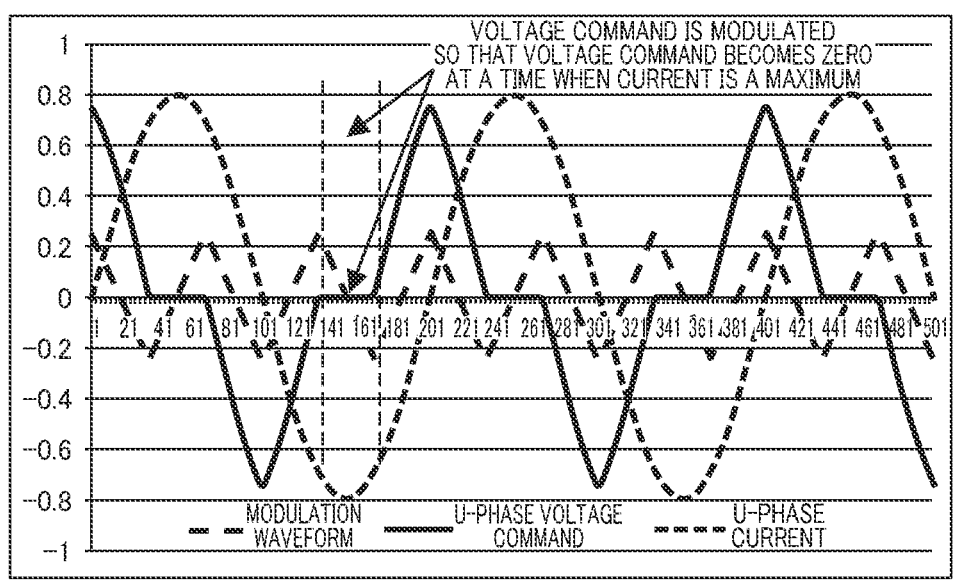
FIG. 4 is a waveform diagram showing a state of the modulation by a phase current, according to the embodiment of the present invention.
Figure 5:
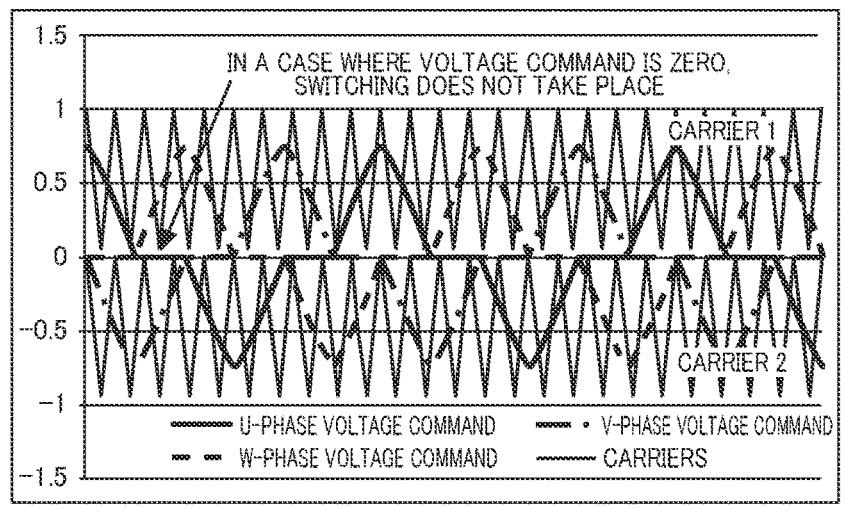
FIG. 5 is a waveform diagram for explaining modulated three phase voltage command values, according to the embodiment of the present invention.

In the following description, embodiments of the present invention will be explained with reference to the drawings. However, the present invention is not limited to the following embodiments. The present invention is characterized in that by adding a three-phase common zero-phase voltage to a voltage command, the voltage command is modulated to an after-mentioned convex modulated waveform as shown in FIG. 4, and the number of cross point between the voltage command and carriers 1 and 2 (i.e. the number of switching times) is reduced as shown in FIG. 5.

The zero-phase voltage modulation is a modulating manner that, by adding the zero-phase voltage common to three phase voltages, performs the modulation without changing a line voltage. The zero-phase voltage of the present invention is determined by detecting a phase of a phase current whose amplitude is a maximum among detected phase currents and selecting a modulation voltage of this maximum current phase so that the voltage command of this phase becomes zero. By setting the voltage command of the maximum current phase to zero, a switching operation of a switching element of the maximum current phase is stopped, then reduction in the loss is achieved.

Embodiment 1

Figure 1:
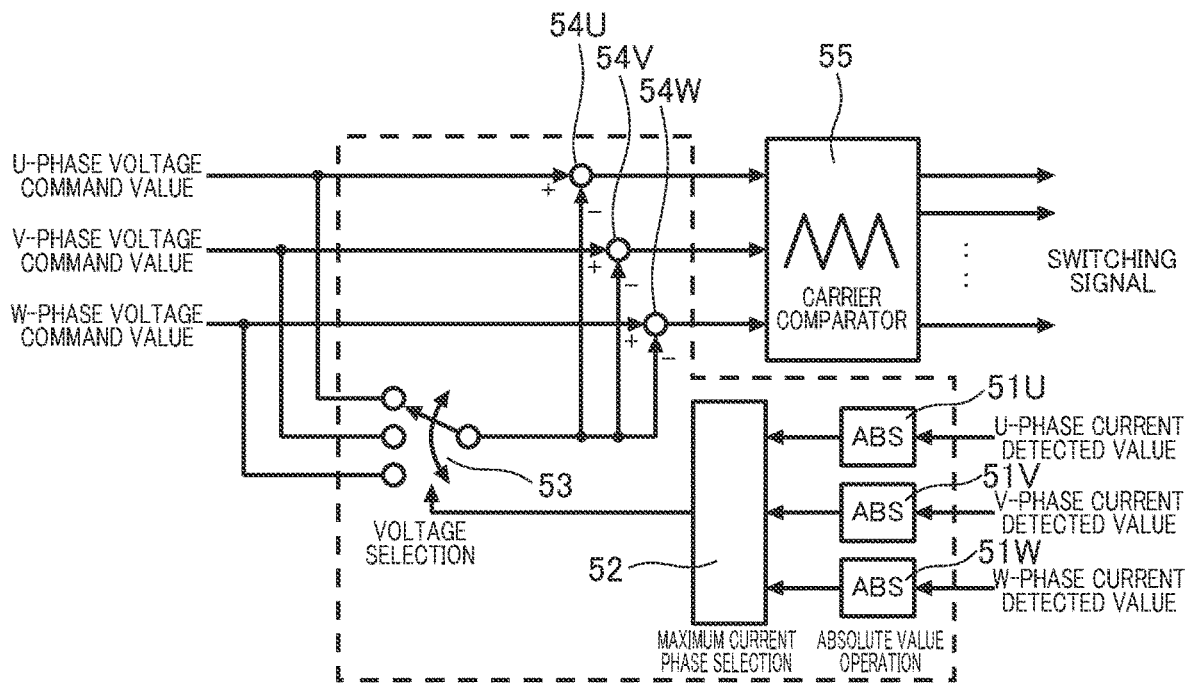
FIG. 1 is a basic configuration according to an embodiment 1 of the present invention.
Figure 9A:
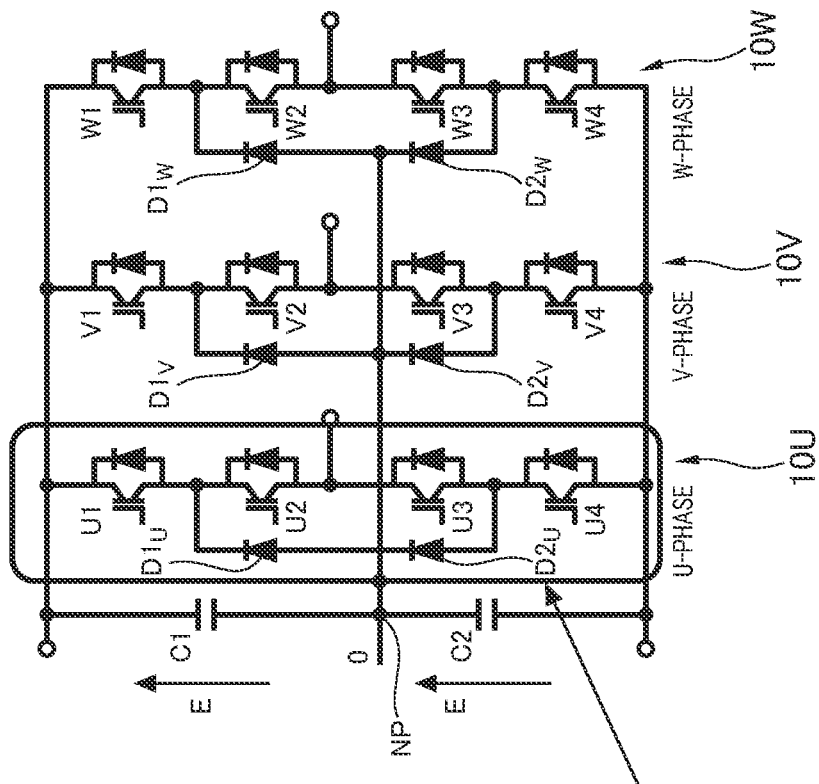
FIGS. 9A and 9B show a loss of a switching element of a maximum current phase in a three-level inverter, which occurs when frequency is zero.
Figure 9B:
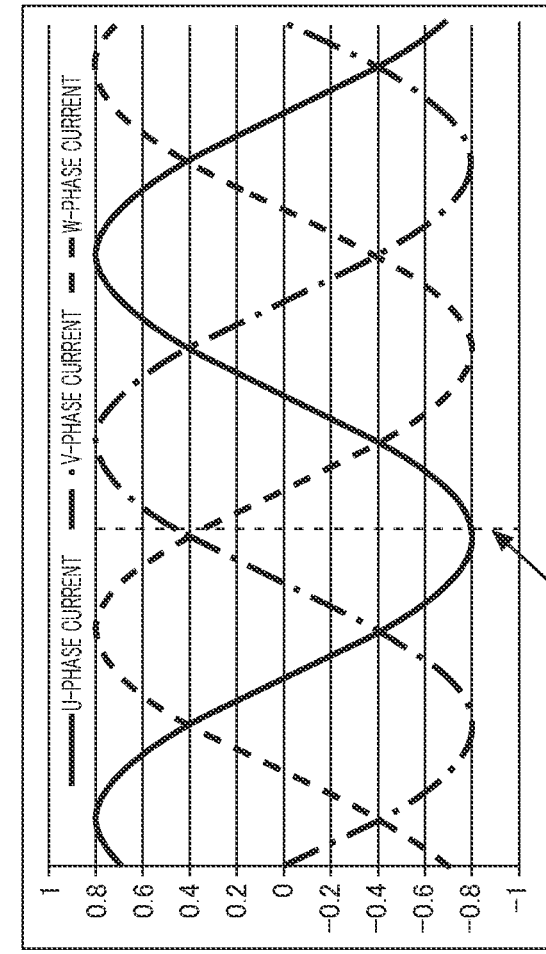
Figure 10:
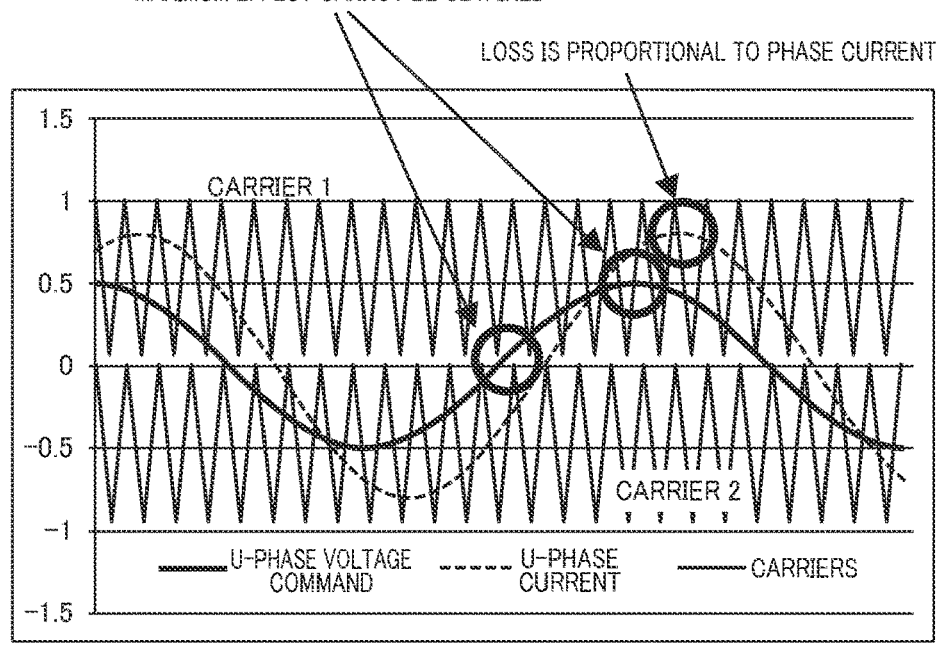
FIG. 10 is a waveform diagram showing a phase difference between voltage and current at a comparison between the voltage command and the carriers in the three-level inverter.
Figure 11:
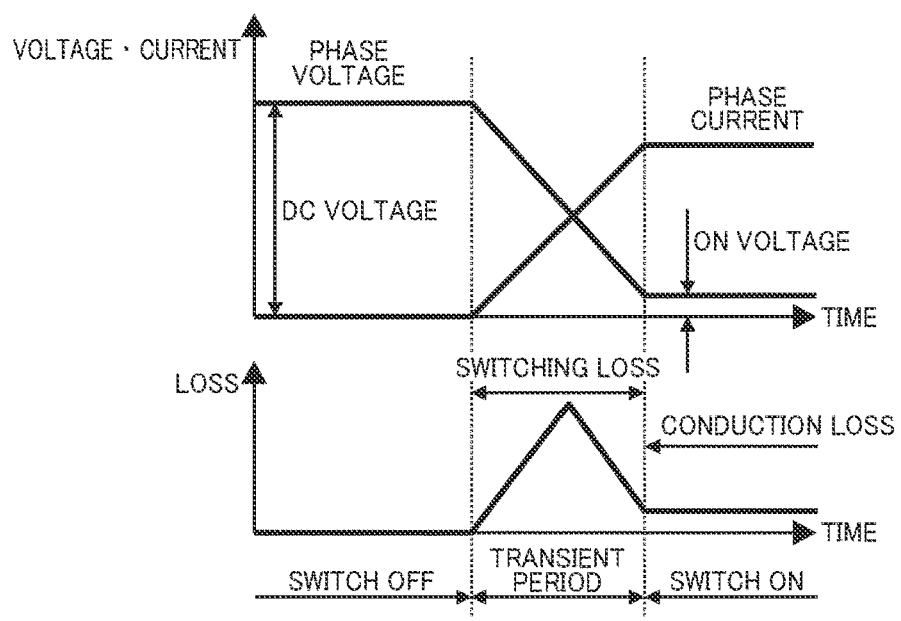
FIG. 11 is an explanatory drawing showing a relationship between voltage·current and loss of the switching element in the three-level inverter.

The present invention is applied to a three-phase N-level inverter (N is odd number of three or more), e.g. a three-level inverter shown in FIG. 9A, and its basic configuration according to an embodiment 1 is shown in FIG. 1. In FIG. 1, 51U, 51V and 51W are absolute value operators (or absolute value computing elements) that determine absolute values of a U-phase current detected value (a current flowing through a U-phase output terminal in FIG. 9A), a V-phase current detected value (a current flowing through a V-phase output terminal in FIG. 9A) and a W-phase current detected value (a current flowing through a W-phase output terminal in FIG. 9A) by performing an absolute value operation of these current detected values.

52 is a maximum current phase selector that selects a phase of a current detected value whose absolute value is a maximum (whose current amplitude is a maximum) from outputs of the absolute value operators 51U, 51V and 51W.

53 is a voltage selecting switch that selects a voltage command value of the maximum current phase selected by the maximum current phase selector 52 from a U-phase voltage command value, a V-phase voltage command value and a W-phase voltage command value.

54U, 54V and 54W are subtractors that subtract the voltage command value of the maximum current phase selected by the voltage selecting switch 53 from the U-phase voltage command value, the V-phase voltage command value and the W-phase voltage command value respectively. Each subtraction output is inputted to a carrier comparator 55.

As an example, in a case where the absolute value of the U-phase current detected value is greater than the absolute value of the V-phase current detected value and the absolute value of the W-phase current detected value, the U-phase voltage command value is selected by the voltage selecting switch 53. Therefore, the U-phase voltage command value becomes the zero-phase voltage.

Further, the voltage command value (after correction) of each phase, which is inputted to the carrier comparator 55 of FIG. 1, is as follows.

U-phase voltage command value(after correction)
=U-phase voltage command value(before correction)−U-phase voltage command value(before correction)=0

V-phase voltage command value(after correction)=V-phase voltage command value(before correction)−U-phase voltage command value(before correction)=0

W-phase voltage command value(after correction)
=W-phase voltage command value(before correction)−U-phase voltage command value(before correction)

The carrier comparator 55 compares each output (the voltage command value after correction (i.e. the corrected voltage command value) for each phase) of the subtractors 54U, 54V and 54W with the carriers 1 and 2, and generates and outputs each ON/OFF command signal (each switching signal) of the switching elements U1 to U4, V1 to V4 and W1 to W4 of FIG. 9A.

Figure 2:
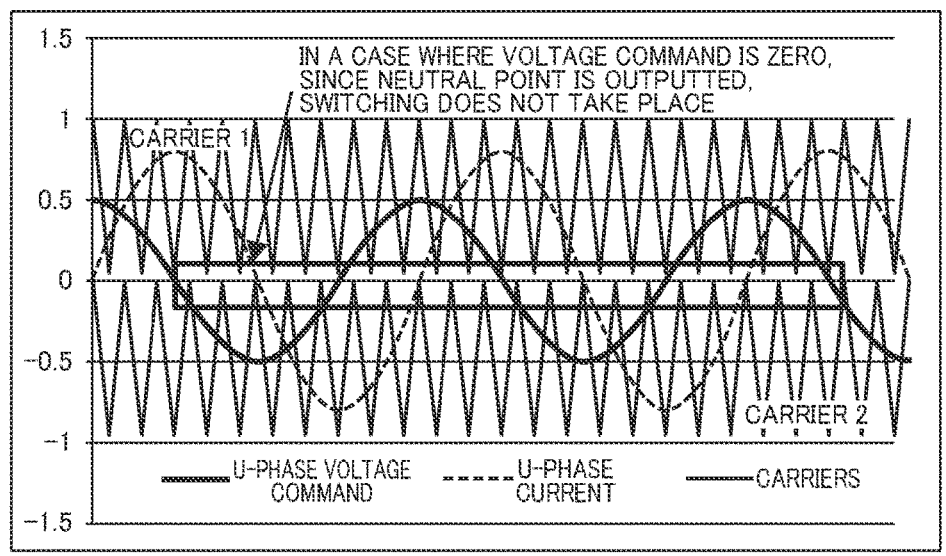
FIG. 2 is a waveform diagram of carriers, an unmodulated voltage command and a current, according to the embodiment of the present invention.
Figure 3:
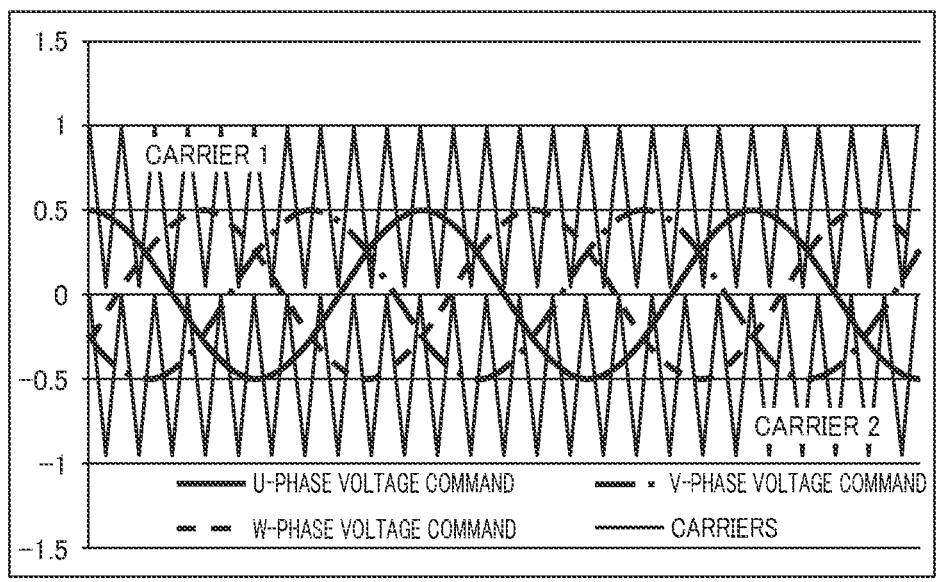
FIG. 3 is a waveform diagram for explaining unmodulated three phase voltage command values, according to the embodiment of the present invention.

Here, FIG. 2 shows a relationship between an unmodulated U-phase voltage command, i.e. the U-phase voltage command before undergoing subtraction by the subtractors 54U, 54V and 54W of FIG. 1, the U-phase current and the carriers 1 and 2. FIG. 3 shows a relationship between unmodulated three phase voltage command values each having a sine wave and the carriers 1 and 2. As shown in FIGS. 2 and 3, a maximum value of the carrier 1 is 1, and a minimum value of the carrier 1 is 0. A maximum value of the carrier 2 is 0, and a minimum value of the carrier 2 is −1.

Therefore, in the three-level inverter, as shown in FIG. 2, in a case where the voltage command value is zero, since the voltage command value does not cross both of the carriers 1 and 2, the switching operation does not take place. Accordingly, by setting the voltage command value of the maximum current phase to zero by the circuit of FIG. 1, it is possible to reduce a switching loss of the maximum current phase.

That is, as shown in FIG. 4 that depicts a state of the modulation of the U-phase voltage command at a timing when the U-phase is selected as the maximum current phase by the maximum current phase selector 52, the U-phase voltage command is modulated (by the subtract by the subtractor 54U) so that the U-phase voltage command becomes zero at a time when the U-phase current is a maximum, and becomes the convex modulated waveform.

As a result, as shown in FIG. 5 that depicts modulated three phase voltage command values, for instance, in a case where the three phase currents become the maximum current phase in sequence in an order of U-phase→W-phase→V-phase, the voltage command of the phase when becoming the maximum current phase is modulated to zero in sequence, and the voltage command value does not cross both of the carriers 1 and 2 for a time period for which the voltage command is zero. Therefore, the switching operation does not take place for this time period. With this, the switching loss of the maximum current phase can be zero, and unbalanced occurrence of the loss between the phases can be reduced, then increase in temperature of the switching element of the specific phase can be suppressed.

Here, in FIG. 1, the detected current is used. However, if three phase current command values are provided, replacement of the detected current with the current command value is possible. In this case, the U-phase current detected value, the V-phase current detected value and the W-phase current detected value of FIG. 1 are replaced with a U-phase current command value, a V-phase current command value and a W-phase current command value respectively.

Further, as long as the circuit configuration has the carrier comparator 55 comparing the voltage command value with the carriers 1 and 2 as shown in FIGS. 1 and 5, the present invention is not limited to the circuit configuration shown in FIG. 9A, but can be applied to other three-level inverters.

Figure 6:
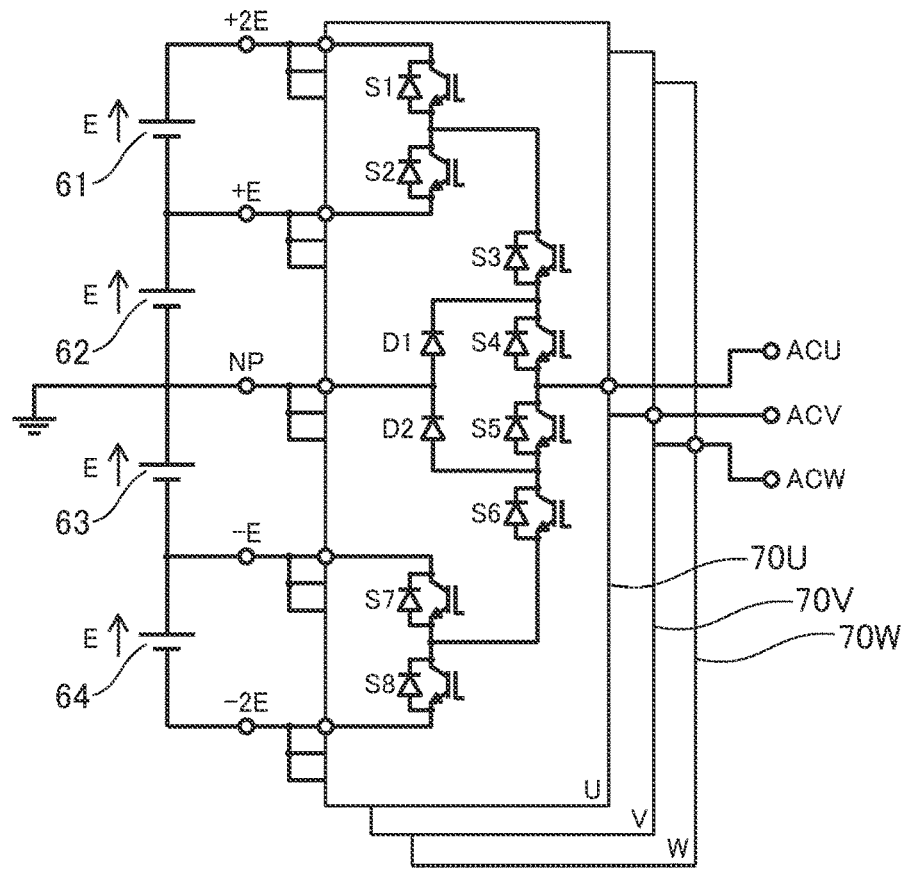
FIG. 6 is a circuit diagram showing a representative configuration of a five-level inverter to which the present invention is applied.

Furthermore, the present invention can also extend to a multi-level inverter having five or more levels of odd number. FIG. 6 shows a representative configuration of a five-level inverter. In FIG. 6, four DC power supplies 61 to 64 are connected in series. A positive electrode of the DC power supply 61 is connected to a +2E terminal, and a negative electrode of the DC power supply 64 is connected to a −2E terminal. A common connecting point of the DC power supplies 61 and 62 is connected to a +E terminal, and a common connecting point of the DC power supplies 63 and 64 is connected to a −E terminal. A common connecting point of the DC power supplies 62 and 63 is connected to an NP terminal that is a neutral point.

A U-phase circuit 70U is configured as follows. Between the +2E terminal and the +E terminal, switching elements S1 and S2 are connected in series. Between the −E terminal and the −2E terminal, switching elements S7 and S8 are connected in series. Between a common connecting point of the switching elements S1 and S2 and a common connecting point of the switching elements S7 and S8, switching elements S3 to S6 are connected in series. Between a common connecting point of the switching elements S3 and S4 and a common connecting point of the switching elements S5 and S6, diodes D1 and D2 whose polarities are shown in the diagram are connected in series. A common connecting point of the diodes D1 and D2 is connected to the NP terminal. A common connecting point (at an inverter output side) of the switching elements S4 and S5 is connected to a U-phase output terminal ACU.

A V-phase circuit 70V and a W-phase circuit 70W are also configured in the same manner as the U-phase circuit 70U, and output sides of the V-phase circuit 70V and the W-phase circuit 70W are connected to a V-phase output terminal ACV and a W-phase output terminal ACW respectively. In the case of the five-level inverter, the number of carrier signal that is compared with each voltage command is four (=N−1) of carriers 1 to 4. Table 2 shows ON/OFF command signals of the U-phase switching elements (S1 to S8) and U-phase output voltages in comparison states between the U-phase voltage command and the carriers 1 to 4 in the five-level inverter of FIG. 6.

[Table 2]

The carrier signal is configured by the four carriers of the carrier 1 (a maximum value: 1, a minimum value: 0.5), the carrier 2 (a maximum value: 0.5, a minimum value: 0), the carrier 3 (a maximum value: 0, a minimum value: −0.5) and the carrier 4 (a maximum value: −0.5, a minimum value: −1).

Also in this case, when the voltage command value is 0, the cross point between the voltage command and each carrier does not occur. Therefore, the present invention can be applied to this case. Hence, also in the case where the control by the circuit of FIG. 1 is applied to the five-level inverter of FIG. 6, in the same manner as FIGS. 4 and 5, the voltage command of the maximum current phase is modulated to zero, and the switching loss of the maximum current phase is reduced.

Embodiment 2

In an embodiment 2, the control of the present invention, which sets the voltage command of the maximum current phase to zero, is carried out only in the extremely low speed region. In the embodiment 1, the control setting the voltage command of the maximum current phase to zero is carried out in a region in which an output frequency of the inverter is from zero frequency to a maximum frequency. Since a load concentration of loss on the switching element of a specific phase occurs only in the extremely low speed region in which the output frequency is several Hz or lower, the control configuration of the embodiment 1 is not necessary for a region in which the output frequency is several Hz or higher.

Further, in a case where percent modulation (or modulation rate) of the voltage is close to 1 (the voltage command is close to the maximum value of the carrier), a zero-phase modulation operation that increases a maximum voltage that can be outputted by three-arm modulation is required. In this case, this zero-phase modulation operation interferes with the zero-phase modulation operation of the embodiment 1.

Figure 7:
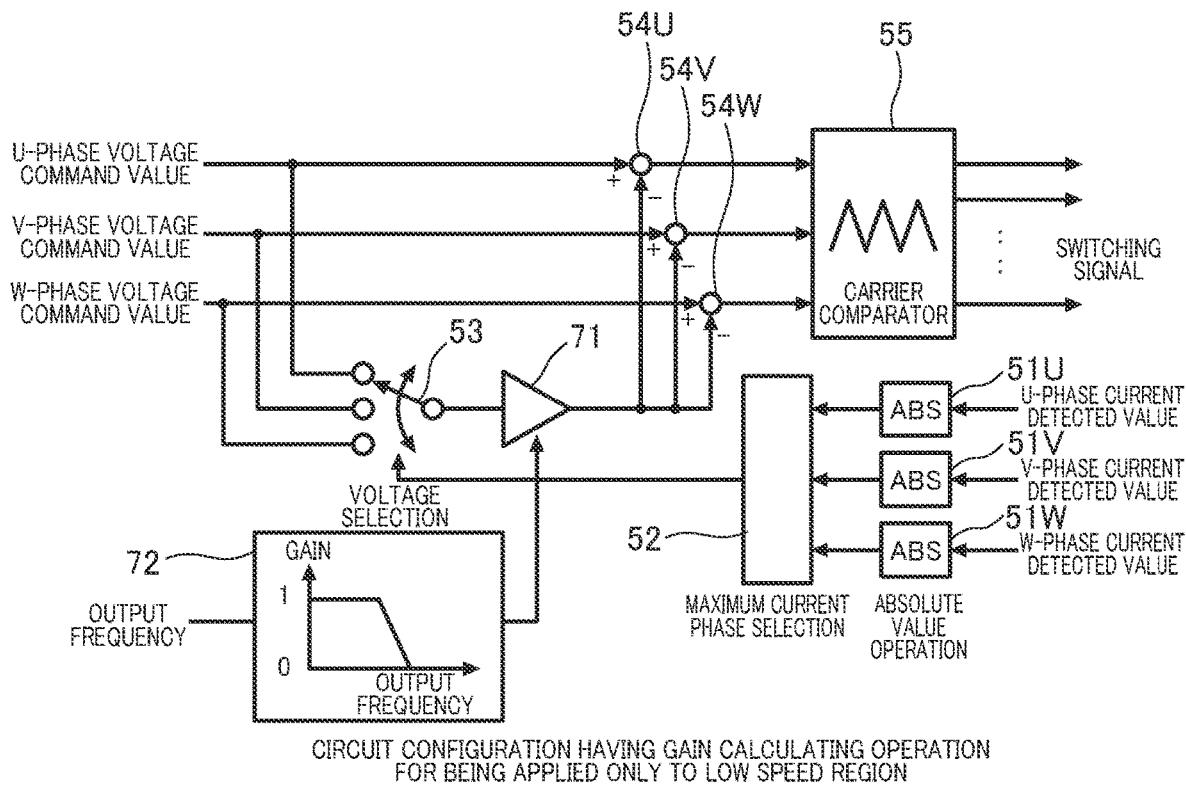
FIG. 7 is a basic configuration according to an embodiment 2 of the present invention.

Therefore, as shown in FIG. 7, again adding circuit (an amplifier) 71 that adds again to the modulation voltage is added to an output side of the voltage selecting switch 53. Also, a gain calculating operator (or a gain calculating element) 72 that calculates the gain from the output frequency is provided. Then, by setting a correction gain to 1 in the extremely low speed region of several Hz or lower and setting the correction gain to zero in the frequency region of several Hz or higher, an occurrence of the modulation voltage is limited to the extremely low speed region. The gain adding circuit 71 and the gain calculating operator 72 form a gain correction unit of the present invention. In FIG. 7, the same element as that of the embodiment 1 is denoted by the same reference sign. It is noted that the output frequency inputted to the gain calculating operator 72 could be the command value or the detected value.

Here, in FIG. 7, the gain is used. However, instead of the gain adding circuit 71, a switch is provided, and an ON/OFF control that performs or does not perform subtraction of the modulation voltage is carried out. However, in the case of the ON/OFF control performing or not performing the subtraction of the modulation voltage, since the modulation voltage rapidly changes, due to stray capacitance between a motor as a load and earth, a leakage current might be increased. Because of this, the ON/OFF control is not employed, but the gain calculating operator 72 of FIG. 7 is configured to have a slope in an output frequency-gain plot (such that the gain is gradually changed from 1 to 0 as the output frequency increases in a region of a specific frequency or higher). With this, increase in the leakage current can be suppressed. The other operation is the same as that of the embodiment 1.

According to the embodiment 2, such effects as the switching loss of the maximum current phase can be zero, unbalanced occurrence of the loss between the phases can be reduced, and increase in temperature of the switching element of the specific phase can be suppressed can be limited to only the extremely low speed region. Then, interference with other control in a high speed region can be avoided.

Embodiment 3

In an embodiment 3, a circuit is configured so that in a case where the current phase is detected by other control, the maximum current phase is detected by that current phase. In the embodiments 1 and 2, the maximum current phase is determined from the absolute value of the current detected value or the absolute value of the current command value.

However, in the case where the phase of the current detected value or the phase of the current command value is determined by other control such as a sensorless vector control, by using that phase, a calculating operation can be reduced or lightened. That is, by using a table as shown in a Table 3 that defines a relationship between the current phase and the maximum current phase, or by determining the maximum current phase from the current phase by calculation, the maximum current phase can be detected.

[Table 3]

Figure 8:
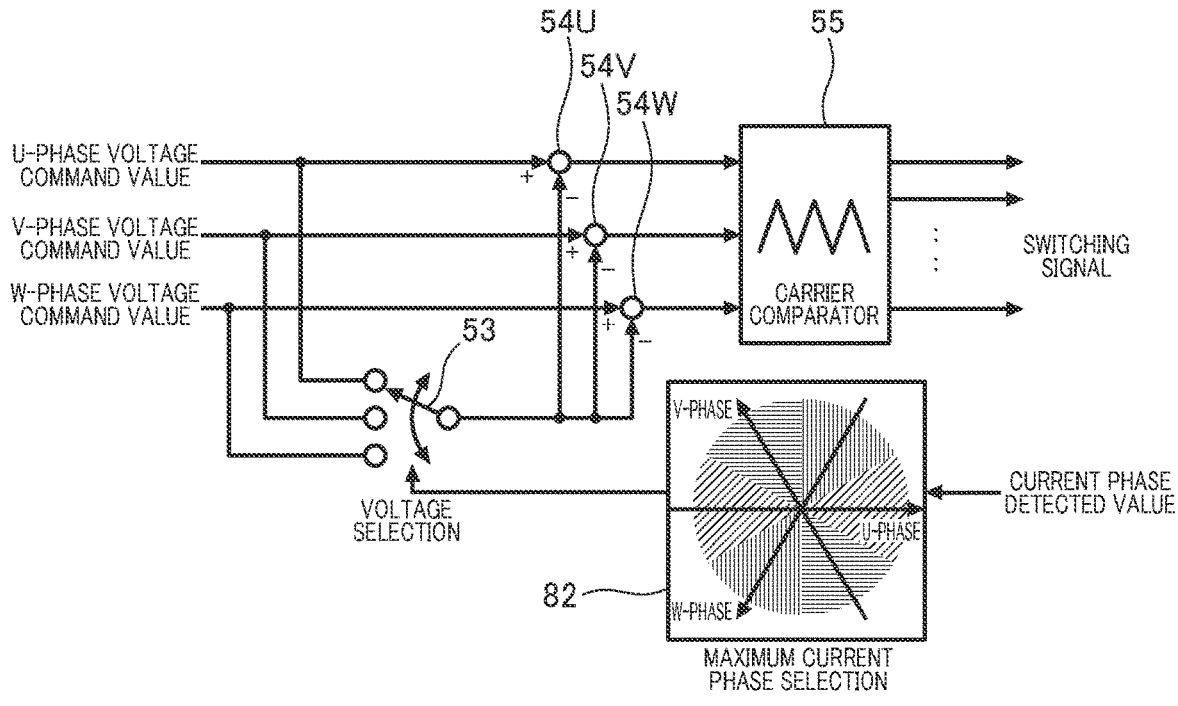
FIG. 8 is a basic configuration according to an embodiment 3 of the present invention.

Therefore, instead of the absolute value operators 51U, 51V and 51W and the maximum current phase selector 52 of FIG. 1, as shown in FIG. 8, a current phase-maximum current phase table shown in Table 3 is provided, or a maximum current phase selector 82 having an operator (or a calculating element) that determines the maximum current phase from the phase of the current detected value or the phase of the current command value is provided. The other elements in FIG. 8 are configured in the same manner as those of FIG. 1.

Here, the maximum current phase selector 82 could be provided instead of the absolute value operators 51U, 51V and 51W and the maximum current phase selector 52 of FIG. 7.

According to the embodiment 3, since the maximum current phase is determined from the current phase, in addition to the effects of the embodiments 1 and 2, an effect of lightning an operating load can be obtained.

TABLE 1

| STATE | U-PHASE OUTPUT VOLTAGE | U1 | U2 | U3 | U4 |
|---|---|---|---|---|---|
| U-PHASE VOLTAGE COMMAND ≥ CARRIER 1 | E | ON | ON | OFF | OFF |
| CARRIER 1 > U-PHASE VOLTAGE COMMAND > CARRIER 2 | 0 | OFF | ON | ON | OFF |
| CARRIER 2 ≥ U-PHASE VOLTAGE COMMAND | −E | OFF | OFF | ON | ON |

TABLE 2

| STATE | U-PHASE OUTPUT VOLTAGE | S1 | S2 | S3 | S4 | S5 | S6 | S7 | S8 |
|---|---|---|---|---|---|---|---|---|---|
| U-PHASE VOLTAGE COMMAND ≥ CARRIER 1 | 2E | ON | OFF | ON | ON | OFF | OFF | ON | OFF |
| CARRIER 1 ≥ U-PHASE VOLTAGE COMMAND > CARRIER 2 | E | OFF | ON | ON | ON | OFF | OFF | ON | OFF |
| CARRIER 2 ≥ U-PHASE VOLTAGE COMMAND > CARRIER 3 | 0 | OFF | ON | OFF | ON | ON | OFF | ON | OFF |
| CARRIER 3 ≥ U-PHASE VOLTAGE COMMAND > CARRIER 4 | −E | OFF | ON | OFF | OFF | ON | ON | ON | OFF |
| CARRIER 4 ≥ U-PRASE VOLTAGE COMMAND | −2E | OFF | ON | OFF | OFF | ON | ON | OFF | ON |

TABLE 3

| CURRENT PHASE | MAXIMUM CURRENT PHASE |
|---|---|
| 330° (~30°)~30° | U-PHASE |
| 30°~90° | W-PHASE |
| 90°~150° | V-PHASE |
| 150°~210° | U-PHASE |
| 210°~270° | W-PHASE |
| 270°~330° | V-PHASE |

The invention claimed is:

1. A control device of a multi-level inverter, the multi-level inverter being a three-phase N-level inverter (N is odd number of three or more) and generating a switching signal of each switching element in the three-phase N-level inverter by a comparison between each of voltage command values of a U-phase, a V-phase and a W-phase and (N−1) carrier signals, the control device comprising: a maximum current phase selector configured to select a maximum current phase whose current amplitude is a maximum on a basis of (1) current detected values or current command values of the three phases of the N-level inverter or (2) phases of the current detected values or phases of the current command values; a subtractor configured to subtract a voltage command value of a selected maximum current phase from each of the voltage command values of the three phases of the N-level inverter; and a switching signal generator configured to compare each of subtracted voltage command values of the three phases with the (N−1) carrier signals and generate a switching signal of each switching element of the N-level inverter.

2. The control device of the multi-level inverter as claimed in claim 1, further comprising: a gain corrector configured to add a gain to the voltage command value of the maximum current phase selected by the maximum current phase selector so as to decrease the gain in a region in which an output frequency of the inverter is a setting frequency or a frequency higher than the setting frequency, and wherein the subtractor is configured to subtract an output of the gain corrector from each of the voltage command values of the three phases.

3. The control device of the multi-level inverter as claimed in claim 1, wherein: the maximum current phase selector is configured to select the maximum current phase on a basis of phases of the current detected values or phases of the current command values.

4. A method of controlling a multi-level inverter, the multi-level inverter being a three-phase N-level inverter (N is odd number of three or more) and generating a switching signal of each switching element in the three-phase N-level inverter by a comparison between each of voltage command values of a U-phase, a V-phase and a W-phase and (N−1) carrier signals, the method comprising: a maximum current phase selecting step of selecting a maximum current phase whose current amplitude is a maximum on a basis of (1) current detected values or current command values of the three phases of the N-level inverter or (2) phases of the current detected values or phases of the current command values; a subtracting step of subtracting a voltage command value of a selected maximum current phase from each of the voltage command values of the three phases of the N-level inverter; and a switching signal generating step of comparing each of subtracted voltage command values of the three phases with the (N−1) carrier signals and generating a switching signal of each switching element of the N-level inverter.

5. The method of controlling the multi-level inverter as claimed in claim 4, further comprising: a gain correcting step of adding a gain to the voltage command value of the maximum current phase selected by the maximum current phase selecting step so as to decrease the gain in a region in which an output frequency of the inverter is a setting frequency or a frequency higher than the setting frequency, and wherein in the subtracting step, an output of the gain correcting step is subtracted from each of the voltage command values of the three phases.

6. The method of controlling the multi-level inverter as claimed in claim 4, wherein: in the maximum current phase selecting step, the maximum current phase is selected on a basis of phases of the current detected values or phases of the current command values.

* * * * *